United States Patent
Cherian et al.

(10) Patent No.: US 8,214,421 B2
(45) Date of Patent: Jul. 3, 2012

(54) CONFORMANCE TESTING WITHOUT REFERENCE IMPLEMENTATION OF AN XML STANDARD

(75) Inventors: Sanjay John Cherian, Irving, TX (US); Suresh K. Damodaran-Kamal, Dallas County, TX (US)

(73) Assignee: IBM International Group BV (NL)

( * ) Notice: Subject to any disclaimer, the term of this patent is extended or adjusted under 35 U.S.C. 154(b) by 1570 days.

(21) Appl. No.: 10/174,520

(22) Filed: Jun. 17, 2002

(65) Prior Publication Data

US 2003/0233395 A1    Dec. 18, 2003

(51) Int. Cl.
*G06F 15/16* (2006.01)

(52) U.S. Cl. .......................................... 709/200; 714/39

(58) Field of Classification Search .......... 709/204–205, 709/219, 200; 714/39
See application file for complete search history.

(56) References Cited

U.S. PATENT DOCUMENTS

| | | | |
|---|---|---|---|
| 4,991,176 A | 2/1991 | Dahbura et al. | |
| 5,623,499 A | 4/1997 | Ko et al. | |
| 5,655,075 A | 8/1997 | Saito et al. | |
| 5,659,555 A | 8/1997 | Lee et al. | |
| 5,768,498 A | 6/1998 | Boigelot et al. | |
| 5,870,590 A | 2/1999 | Kita et al. | |
| 5,966,306 A | 10/1999 | Nodine et al. | |
| 6,012,052 A | 1/2000 | Altschuler et al. | |
| 6,138,157 A * | 10/2000 | Welter et al. .................. | 709/224 |
| 6,212,669 B1 | 4/2001 | Jain | |
| 6,373,822 B1 * | 4/2002 | Raj et al. ....................... | 370/252 |
| 6,560,723 B1 * | 5/2003 | Matsui ............................ | 714/39 |
| 6,697,967 B1 * | 2/2004 | Robertson ....................... | 714/43 |
| 6,772,413 B2 * | 8/2004 | Kuznetsov ..................... | 717/136 |
| 6,915,456 B2 * | 7/2005 | Banerjee et al. ............... | 714/39 |
| 6,918,066 B2 * | 7/2005 | Dutta et al. .................... | 714/46 |
| 7,216,260 B2 * | 5/2007 | Hartmann et al. ............. | 714/39 |
| 2003/0191988 A1 * | 10/2003 | Dalal et al. ..................... | 714/39 |
| 2009/0113287 A1 * | 4/2009 | Yee ................................ | 715/234 |

OTHER PUBLICATIONS

Sachs and Ibbotson. Electronic Trading-Partner Agreement for E-Commerce (tpaML) Pre-submission Draft, Version 1.0.3. Jan. 2000. IBM.*

* cited by examiner

*Primary Examiner* — Faruk Hamza
*Assistant Examiner* — Oleg Survillo
(74) *Attorney, Agent, or Firm* — Cantor Colburn LLP; Jeanine Ray

(57) ABSTRACT

Messages exchanged between two or more participants are conformance tested to a specific markup language standard without using a reference implementation of the markup language standard. Conformance is tested by executing verification rules corresponding to the specific markup language standard, where the verification rules comprise a representation of at least one protocol verification graph.

32 Claims, 3 Drawing Sheets

CONFORMANCE TESTING WITHOUT REFERENCE IMPLEMENTATION OF AN XML STANDARD

BACKGROUND OF THE INVENTION

1. Field of the Invention

The present invention relates to conformance testing methods and systems.

2. Description of the Related Art

Business transactions over the Internet involve sending and receiving documents. The documents may be based on Extensible Markup Language (XML) or any other computer language. XML standards for Electronic Business Using XML such as ebXML Message Service Specification specify sequences in which documents need to be sent and received, a format (type) of the documents, and any time interval or other constraints a given sequence must follow. In this patent application, an XML protocol refers to a defined order for sending and receiving XML documents based on the constraints outlined above.

Interoperability tests are carried out in the industry to verify conformance of participants to an XML protocol. The tests require each participant to implement an application that can process received messages/documents and send messages/documents conforming to the XML standard. In this patent application, XML documents are referred to as XML messages to avoid an irrelevant discussion of packaging of documents into messages.

Currently, conformance testing is carried out as follows. Consider a participant interested in checking that its application conforms to a standard, such as ebXML Message Service Specification for example. The participant application (e.g. ebXML Message Handler) sends XML messages to a conformance testing system (CTS). The CTS processes the messages and responds with XML messages. The CTS can be another participant or an agreed-upon third party.

At present, the CTS must be an application implementation (e.g. ebXML Message Handler) conformant to an XML standard (e.g. ebXML Message Service Specification) for conformance testing to take place. In other words, the CTS must be a reference implementation of the XML standard specifications. Such reference implementation tests for the constraints in message sequences described above. Note that verifying the conformance of the type of the message to a particular XML schema is only one part of conformance testing.

The requirement that a reference implementation is used as the CTS has many inefficiencies that have broad effects on interoperability and conformance testing of XML standards. First, for conformity testing of each new standard, a new working application conforming to the standard is required. In the ebXML example, to conform to another standard such as RosettaNet Implementation Framework (RNIF) 2.0 in addition to the ebXML Messaging Handler, an RNIF 2.0 handler needs to be implemented. Second, more processing resources are expended by having concurrent conformance testing for multiple standards. Third, to make changes to the standard and to reflect the changes in the conformance testing involves effort in re-working the original solution.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Embodiments of the present invention mitigate the aforementioned inefficiencies by creating a computer-usable description of XML message sequencing in the form of one or more protocol verification graphs, and verifying that sequences of messages exchanged among two or more protocol participants are valid paths in the protocol verification graphs. Thus, conformance testing can be performed without requiring a reference implementation of the XML standard.

A CTS service can be created for one or more XML standards. Parties who wish to verify that their implementation of an XML standard is compliant can submit to the CTS messages they sent and received from another implementation. Based on the messages, the CTS determines whether the implementation is compliant or non-compliant.

Embodiments of the present invention have impact in verifying and testing conformance of participant applications to a published XML standard that specifies one or more particular XML protocols.

Figure 1:
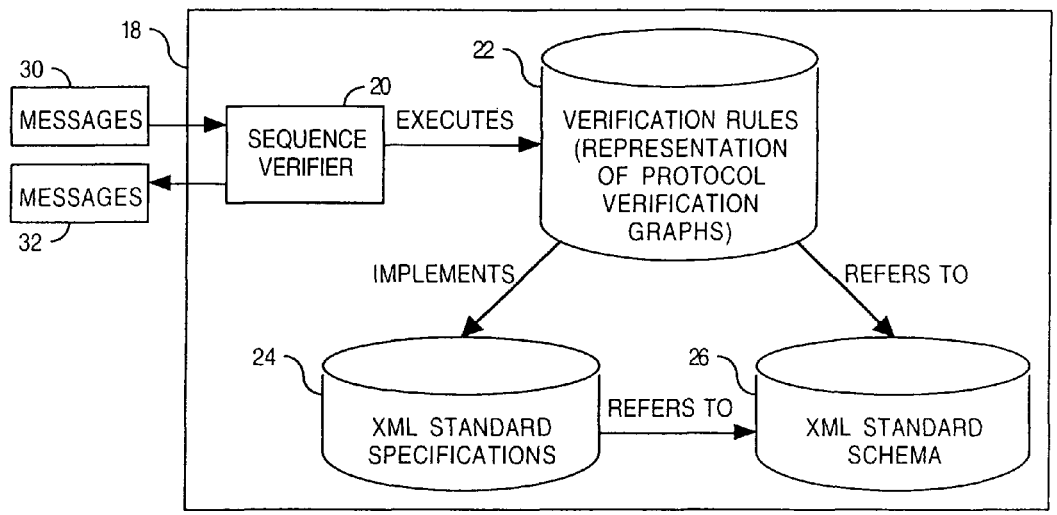
FIG. 1 is a block diagram of an embodiment of a conformance testing system.

FIG. 1 is a block diagram of an embodiment of a CTS 18. The CTS 18 comprises a sequence verifier 20 that executes verification rules 22 stored by a computer-readable medium. The verification rules 22 correspond to a specific XML standard. Examples of the specific XML standard include, but are not limited to, the ebXML Messaging Specifications. The verification rules 22 may be expressed in XML itself. A structural schema language such as Schematron is a specific XML technology that allows such representation. A set of the verification rules 22 is a representation of one or more protocol verification graphs corresponding to a single XML standard. Each protocol verification graph describes constraints on the messages, e.g. sequence, type and other constraints. The protocol verification graphs are created manually by analyzing an XML standards specification 24. Both the verification rules 22 and the XML standards specification 24 refer to an XML standard schema 26 that defines the type of the components (XML elements) of the message.

The sequence verifier 20 receives messages 30 that were exchanged between two or more participants. The sequence verifier 20 verifies that the messages 30 conform to appropriate message types based on the XML standard schema 26. The sequence verifier 20 also verifies that the messages 30 were exchanged in a correct order based on the protocol verification graphs. The sequence verifier 20 optionally determines whether or not the messages were exchanged within specific time constraints. Other optional constraints which may be tested by the sequence verifier 20 include, but are not limited to, acceptable bounds on a number of repeated messages.

If the sequence verifier 20 determines noncompliance of the exchanged messages 30 based on the aforementioned constraints, the sequence verifier 20 further acts to identify which of the partners involved in the protocol does not conform to the protocol. The sequence verifier 20 further identifies which of the messages 30 are non-conforming.

The sequence verifier 20 communicates one or more messages 32 indicating the result of the conformance testing. The messages 32 indicate whether or not conformance is verified. For non-conformance results, the messages 32 further identify which of the partners do not conform and which messages are non-conforming.

Figure 2:
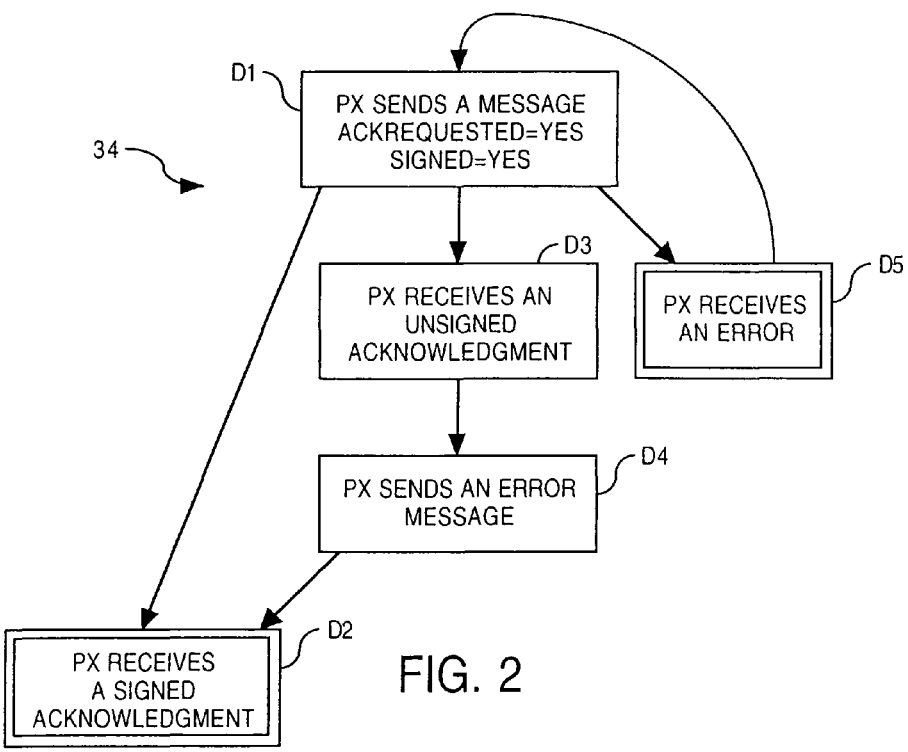
FIG. 2 is an example of a partial protocol verification graph.

FIG. 2 is an example of a partial protocol verification graph 34 usable by the verification rules 22. The protocol verification graph 34 describes some ebXML messaging sequences in ebXML Messaging Specifications. The graph 34 comprises nodes D1, D2, D3, D4 and D5 each representing a message that must conform to a specific type. The type can be identified by an XML namespace specified within the XML standard. Here, the standard is the ebXML Messaging Specification.

Within the graph 34, "Px" refers to a particular participant, such as either participant one (P1) or participant two (P2) but not both in one instance of a protocol verification graph. The node D1 represents Px sending a message which requests a signed acknowledgment (e.g. where ackRequested=yes and signed=yes). The node D2 represents Px receiving a signed acknowledgment. The node D3 represents Px receiving an unsigned acknowledgment. The node D4 represents Px sending an error message, e.g. as a result of receiving an unsigned acknowledgment when a signed acknowledgment was requested. The node D5 represents Px receiving an error message.

Without loss of generality, consider Px representing P1. The valid sequences in a message communication between two participants P1 and P2 in conformance testing are: (a) each path in the graph 34 from a start node D1 to an end node (either D2 or D5), and (b) each subpath of each such sequence that includes the start node D1. For the graph 34, the valid sequences include, but are not limited to, D1-D2, D1-D3-D4-D2, D1-D3, D1-D5-D1-D3-D4-D2, etc.

Thus, the conformance testing problem transforms to verifying whether a sequence of messages which transpired between P1 and P2 is a valid sequence in the protocol verification graph 34.

Identification of which participant(s) and/or messages do not conform to the protocol can be performed as follows. Consider the sequence D1-D5 occurring in a particular instance of testing, where Px=P1. In other words, P1 attempts to send a message requesting a signed acknowledgment, and receives an error message in response thereto. Possible causes for this sequence include: (a) the message sent by P1 did not conform to the required message format, (b) the message sent by P1 was conforming when sent by P1 but somehow was garbled or otherwise altered when received by P2, and (c) P2 received a conforming document but P2 was non-conforming and thus could not process the message indicated in D1.

Figure 3:
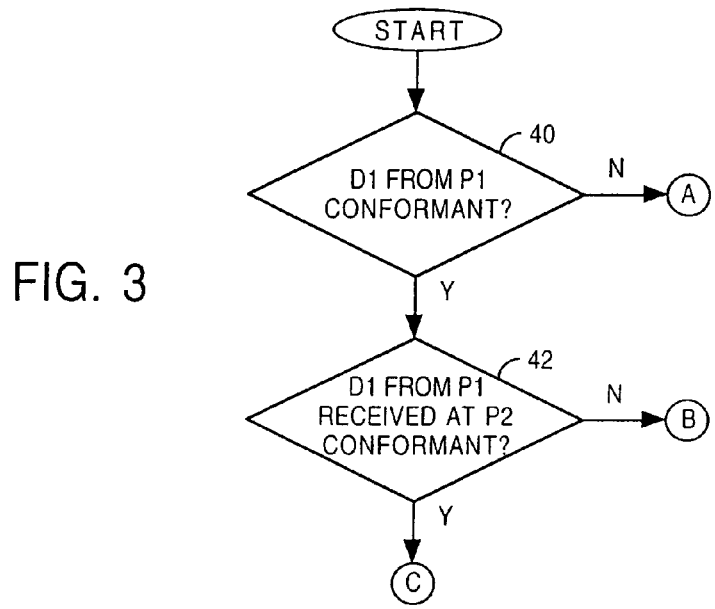
FIG. 3 is a flow chart of an embodiment of a method for determining a cause of non-conformance.

FIG. 3 is a flow chart of an embodiment of a method for determining a cause of non-conformance. As indicated by block 40, the method comprises determining if the message sent from D1 is conforming. If not, then cause (a) from the above paragraph is concluded. If so, the method comprises determining if the message received by D2 is conforming (block 42). If not, then cause (b) from the above paragraph is concluded. If so, then cause (c) from the above paragraph is concluded.

Note that the flow chart does not consider conformance of the error message in node D5 sent from P2. If the error message in node D5 is non-conforming, then P2 may be only partially compliant. This information can be used with the conclusions from the flow chart.

In some cases, the protocol conformance rules are the same for all participants (e.g. by specifying that Px can be either P1 or P2). In other cases, the protocol conformance rules may differ for different participants, in which case different protocol verification graphs exist for different classes of participants. The aforementioned method can be extended to include conformance testing of messages communicated between any number of participants (e.g. more than two participants).

Figure 4:
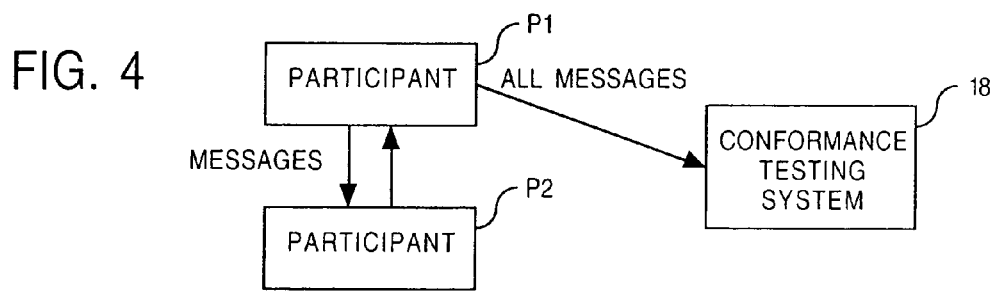
FIG. 4 shows an example of so-called "postmortem" conformance testing.
Figure 5:
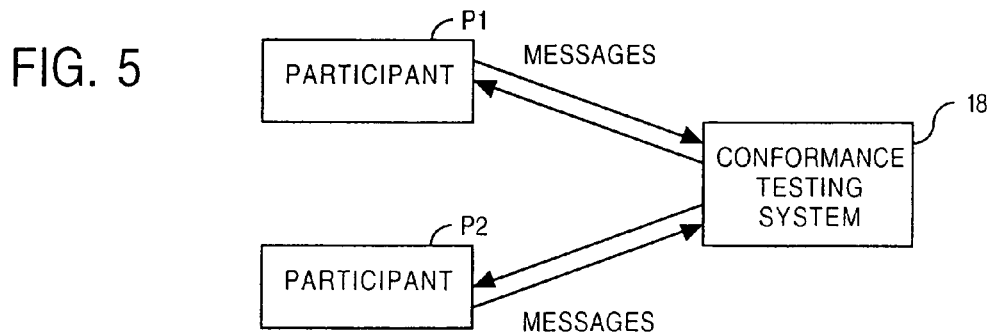
FIG. 5 shows an example of runtime active conformance testing.
Figure 6:
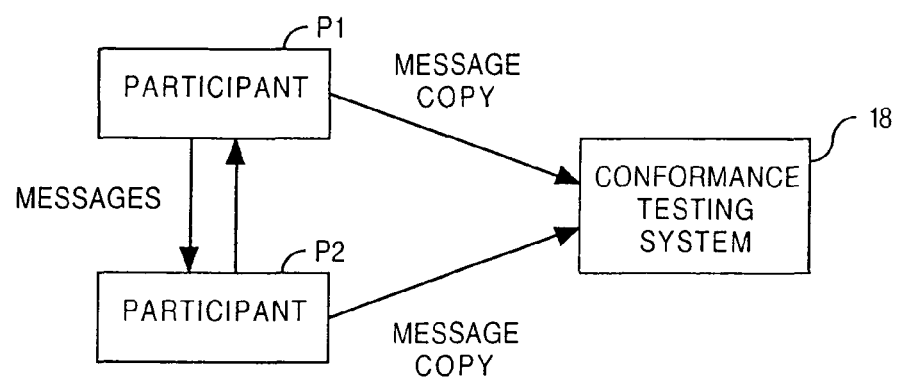
FIG. 6 shows an example of runtime passive conformance testing.

FIGS. 4, 5 and 6 show examples of ways that the CTS 18 can be configured with participants. FIG. 4 shows an example of so-called "postmortem" conformance testing. First, participants P1 and P2 exchange a sequence of messages which are archived by the participant P1. After either all of the messages have transpired or all of the messages have transpired which P1 desires to have conformance tested, P1 submits the sequence of messages to the CTS 18. The CTS 18 maintains the protocol verification graph. The CTS 18 verifies if the type and sequence of the messages conform to the relevant XML standard.

FIG. 5 shows an example of runtime active conformance testing. In this example, the CTS 18 is an active intermediary of messages exchanged between participants P1 and P2. The CTS 18 maintains the protocol verification graph, and verifies at runtime if the type and sequence of messages conform to the standard. The CTS 18 can give feedback to both P1 and P2 contemporaneously with the exchange of messages. Also, the CTS 18 can optionally block non-conforming messages to be sent to the participants.

FIG. 6 shows an example of runtime passive conformance testing. In this example, the CTS 18 passively monitors messages exchanged between participants P1 and P2 at runtime. The CTS 18 receives messages from both P1 and P2, and uses a time stamp such as either a synchronized clock or a relative time scheme to create a reliable message sequence. The CTS 18 maintains the protocol verification graph, and verifies if the type and sequence of the messages are conforming to the standard at runtime or at a later time. Note that in this case, the CTS 18 has the flexibility to defer any obligations to perform conformance testing until after the runtime, thus freeing resource requirements for runtime testing.

It is noted that although FIGS. 4-6 show only two participants, those having ordinary skill will recognize that the number of participants can be more than two, in which case the conformance testing method and system can be scaled accordingly.

The CTS 18 is typically embodied by a programmed computer such as a server computer accessible via a computer network such as an Internet or an intranet. The programmed computer provides the herein-disclosed functionality which may be implemented in hardware and/or software and/or firmware. Typically, the programmed computer includes a computer-readable medium encoded with executable instructions representing a computer program. The programmed computer includes a processor responsive to the computer-readable medium to perform a series of specifically identified operations dictated by the computer program. In this way, the computer program causes the computer to act as described herein to provide CTS functionality.

Embodiments of the present invention have many benefits over the current approach of providing conformance testing systems using a reference implementation of applications conforming to an XML standard.

1. The proposed method and system do not require an implementation of the actual XML standard that can receive and respond to XML messages. Instead, only the protocol verification rules need to be written and executed. The resource requirement of the new approach is substantially lower than the current approach since there is no implementation conforming to the XML standard running as CTS. This gives major savings in cost for providing a conformance testing service, either runtime or postmortem. Further, a number of concurrent conformance tests can be significantly higher with the same amount of processing resources.

2. The new CTS system allows a diverse set of scenarios (postmortem, active runtime and passive runtime) that allows creation of new applications.

3. The proposed technique can be applied in products that use an XML standard to create a preprocessing stage with the active runtime configuration. The preprocessing stage may make the product more efficient by processing only valid messages, and more secure by discarding in an earlier stage non-conforming messages that can come from the Internet.

4. To add conformance testing for a new XML standard, it is sufficient to write a new set of verification rules. Another implementation of the standard is not required.

5. Prior CTS intermediaries are implemented as a reference implementation with all the features specified in the XML standard. A shortcoming of this is that messages are processed and possibly changed by the CTS intermediary, e.g. with time stamps, by the time same message is delivered to a participant P2. Using the teachings herein, the CTS can non-intrusively perform conformance testing. The CTS is effectively transparent to P1 and P2. This non-intrusive, yet aware, approach can lead to the creation of a variety of XML protocol blockers (e.g. firewalls) that are specific to a standard.

It will be apparent to those skilled in the art that the disclosed inventions may be modified in numerous ways and may assume many embodiments other than the preferred forms specifically set out and described herein. For example, although the detailed description is made with reference to XML, the teachings herein can be applied to any markup language and any type of structured message sequences that are exchanged between participants provided the message type can be independently specified. XML happens to be such a structured message type.

Accordingly, it is intended by the appended claims to cover all modifications which fall within the true spirit and scope of the present invention.

What is claimed is:

1. A computer-implemented method comprising:
  receiving, with a processor executing a sequence verifier, a plurality of messages exchanged between two or more participants, the sequence verifier being a single module that is distinct from the two or more participants, the plurality of messages comprising a first message sent from a first participant of the two or more participants to a second participant of the two or more participants and a second message sent from the second participant of the two or more participants to the first participant of the two or more participants, forming a sequence; and
  testing conformance of each of the plurality of messages, with the processor executing the sequence verifier, to a specific markup language standard without using a reference implementation of the markup language standard;
  wherein testing conformance compares the first message in the sequence of messages exchanged between the first participant and the second participant to a valid sequence in a protocol verification graph to test conformance of the first message, and compares the second message in the sequence of messages exchanged between the first participant and the second participant to a valid sequence in the protocol verification graph to test conformance of the second message, the testing conformance verifying that the first message and second message conform to an appropriate message type based on a standard schema and were exchanged in a correct order based on the protocol verification graph;
  wherein the protocol verification graph describes constraints on a message including message sequence constraints and message type constraints, the protocol verification graph being created by analyzing an Extensible Markup Language (XML) standards specification.

2. The method of claim 1, further comprising:
  providing verification rules corresponding to the specific markup language standard, the verification rules comprising a representation of the protocol verification graph;
  wherein said testing conformance comprises executing, with a processor of the sequence verifier, the verification rules to test conformance of each of the plurality of messages to the markup language standard.

3. The method of claim 2, wherein the protocol verification graph comprises a plurality of nodes each representing a message that must conform to a specific type.

4. The method of claim 2, wherein the protocol verification graph comprises a plurality of different protocol verification graphs of different classes of the two or more participants.

5. The method of claim 1, wherein said testing conformance comprises determining whether the plurality of messages were exchanged within one or more specific time constraints.

6. The method of claim 1, wherein said testing conformance comprises determining whether the plurality of messages comprise an acceptable number of repeated messages.

7. The method of claim 1, further comprising:
  identifying which of the two or more participants is non-conformant to the specific markup language standard when said testing conformance indicates that the plurality of messages are non-conformant with the specific markup language standard.

8. The method of claim 1, further comprising:
  identifying which of the plurality of messages is non-conformant to the specific markup language standard when said testing conformance indicates that the plurality of messages are non-conformant with the specific markup language standard.

9. The method of claim 1, wherein said testing conformance is performed by an active intermediary of messages exchanged between the two or more participants, and is performed during runtime.

10. The method of claim 9, further comprising:
  providing feedback messages to the two or more participants contemporaneously with the exchange of the plurality of messages, the feedback messages being based on the conformance of the plurality of messages.

11. The method of claim 9, further comprising:
  blocking non-conforming messages of the plurality of messages from being sent to at least one of the two or more participants.

12. The method of claim 1, further comprising:
  passively monitoring the plurality of messages exchanged between the two or more participants.

13. The method of claim 12, wherein said testing conformance is performed during runtime.

14. The method of claim 12, wherein said testing conformance is performed after runtime.

15. The method of claim 1, further comprising:
said receiving the plurality of messages comprises receiving the plurality of messages after all of the plurality of messages have been exchanged between the two or more participants.

16. The method of claim 1, wherein the markup language standard is based on an extensible markup language (XML).

17. A conformance testing system, comprising:
a sequence verifier stored in a non-transitory computer-readable medium; and
a processor configured to execute instructions stored in the medium that cause the sequence verifier to:
receive a plurality of messages exchanged between two or more participants; and
test conformance of each of the plurality of messages to a specific markup language standard without using a reference implementation of the markup language standard;
wherein the sequence verifier is a single module that is distinct from the two or more participants;
wherein the plurality of messages comprise a first message sent from a first participant of the two or more participants to a second participant of the two or more participants and a second message sent from the second participant of the two or more participants to the first participant of the two or more participants, forming a sequence;
wherein testing conformance comprises:
comparing the first message in the sequence of messages exchanged between the first participant and the second participant to a valid sequence in a protocol verification graph to test conformance of the first message; and
comparing the second message in the sequence of messages exchanged between the first participant and the second participant to a valid sequence in the protocol verification graph to test conformance of the second message, the sequence verifier verifying that the first message and second message conform to an appropriate message type based on a standard schema and were exchanged in a correct order based on the protocol verification graph;
wherein the protocol verification graph describes constraints on a message including message sequence constraints and message type constraints, the protocol verification graph being created by analyzing an Extensible Markup Language (XML) standards specification.

18. The conformance testing system of claim 17, wherein the computer-readable medium stores verification rules corresponding to the markup language standard, the verification rules comprising a representation of the protocol verification graph; and
wherein the processor executes the verification rules to test conformance of the plurality of messages to the markup language standard.

19. The conformance testing system of claim 18, wherein the protocol verification graph comprises a plurality of nodes each representing a message that must conform to a specific type.

20. The conformance testing system of claim 18, wherein the protocol verification graph comprises a plurality of different protocol verification graphs of different classes of the two or more participants.

21. The conformance testing system of claim 17, wherein the sequence verifier is to determine whether each of the plurality of messages were exchanged within one or more specific time constraints.

22. The conformance testing system of claim 17, wherein the sequence verifier is to determine whether the plurality of messages comprise an acceptable number of repeated messages.

23. The conformance testing system of claim 17, wherein when the sequence verifier determines that the plurality of messages are non-conformant with the markup language standard, the sequence verifier is to identify which of the two or more participants is in non-conformance to the markup language standard.

24. The conformance testing system of claim 17, wherein when the sequence verifier determines that the plurality of messages are non-conformant with the markup language standard, the sequence verifier is to identify which of the plurality of messages is non-conformant to the markup language standard.

25. The conformance testing system of claim 17, wherein the sequence verifier is an active intermediary of messages exchanged between the two or more participants, and is to test conformance during runtime.

26. The conformance testing system of claim 25, wherein the sequence verifier is to provide feedback messages to the two or more participants contemporaneously with the exchange of the plurality of messages, the feedback messages being based on the conformance of the plurality of messages.

27. The conformance testing system of claim 25, wherein the sequence verifier is to block non-conforming messages of the plurality of messages from being sent to at least one of the two or more participants.

28. The conformance testing system of claim 17, wherein the sequence verifier is to passively monitor the plurality of messages exchanged between the two or more participants.

29. The conformance testing system of claim 28, wherein the sequence verifier is to test conformance during runtime.

30. The conformance testing system of claim 28, wherein the sequence verifier is to test conformance after runtime.

31. The conformance testing system of claim 17, wherein the sequence verifier is to receive and test conformance of the plurality of messages after all of the plurality of messages have been exchanged between the two or more participants.

32. The conformance testing system of claim 17, wherein the markup language standard is based on an extensible markup language (XML).

* * * * *